(12) United States Patent
Sundaram et al.

(10) Patent No.: US 11,797,575 B2
(45) Date of Patent: Oct. 24, 2023

(54) CAPTURING DATA LAKE CHANGES

(71) Applicant: Salesforce, Inc., San Francisco, CA (US)

(72) Inventors: Shreedhar Sundaram, San Francisco, CA (US); Mahalaxmi Sanathkumar, San Francisco, CA (US); Aaron Zhang, San Francisco, CA (US); Parin Kenia, Sunnyvale, CA (US); Violet Gong, San Francisco, CA (US); Priya Sethuraman, Fremont, CA (US); Zhidong Ke, San Francisco, CA (US); Kevin Terusak, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 86 days.

(21) Appl. No.: 16/775,306

(22) Filed: Jan. 29, 2020

(65) Prior Publication Data

US 2021/0232604 A1   Jul. 29, 2021

(51) Int. Cl.
*G06F 16/28*       (2019.01)
*G06F 16/2453*    (2019.01)
*G06F 16/23*       (2019.01)

(52) U.S. Cl.
CPC ........ *G06F 16/283* (2019.01); *G06F 16/2322* (2019.01); *G06F 16/2358* (2019.01); *G06F 16/24534* (2019.01)

(58) Field of Classification Search
CPC ............. G06F 16/283; G06F 16/24534; G06F 16/2358; G06F 16/2322
See application file for complete search history.

(56) References Cited

U.S. PATENT DOCUMENTS

| | | |
|---|---|---|
| 9,495,430 B2 | 11/2016 | Rajendran et al. |
| 10,455,264 B2 | 10/2019 | Patel et al. |
| 2005/0086270 A1* | 4/2005 | Shimizu .............. G06F 16/2358 |
| 2006/0155945 A1* | 7/2006 | McGarvey .............. H04L 67/10 |
| | | 711/159 |
| 2015/0120656 A1* | 4/2015 | Ramnarayanan ... G06F 16/2358 |
| | | 707/616 |
| 2016/0070739 A1* | 3/2016 | Gukal ..................... G06F 17/40 |
| | | 707/755 |
| 2018/0139118 A1 | 5/2018 | Johnson |
| 2019/0132280 A1* | 5/2019 | Meuninck ........... H04L 63/0272 |
| 2019/0147404 A1 | 5/2019 | Lue et al. |
| 2019/0163791 A1 | 5/2019 | Sanathkumar et al. |
| 2019/0179673 A1 | 6/2019 | Gray et al. |

(Continued)

OTHER PUBLICATIONS

Armbrust et al. Delta Lake: High-Performance ACID Table Storage over Cloud Object Stores. PVLDB, 13(12): 3411-3424, 2020. DOI: https://doi.org/10.14778/3415478.3415560 (Year: 2020).*

(Continued)

*Primary Examiner* — Richard L Bowen
*Assistant Examiner* — Aryan D Toughiry
(74) *Attorney, Agent, or Firm* — Polygon IP, LLP

(57) ABSTRACT

A request may be received to transform records in a data lake that match one or more query criteria. Data lake records that match the criteria may be retrieved. The retrieved records may include two data lake records associated with the same data lake record identifier. A transformed record may be generated based on time stamps associated with the retrieved records.

17 Claims, 8 Drawing Sheets

(56) References Cited

U.S. PATENT DOCUMENTS

| | | |
|---|---|---|
| 2019/0179931 A1 | 6/2019 | Gupta et al. |
| 2019/0213552 A1 | 7/2019 | Gupta et al. |
| 2019/0238604 A1 | 8/2019 | Sundaram et al. |
| 2019/0238605 A1 | 8/2019 | Patel |
| 2019/0332297 A1* | 10/2019 | Zhang ................. G06F 21/6218 |
| 2019/0370080 A1 | 12/2019 | Patel et al. |
| 2019/0373031 A1 | 12/2019 | Patel et al. |
| 2020/0050594 A1 | 2/2020 | Tidwell |
| 2020/0174966 A1* | 6/2020 | Szczepanik ............. G06F 16/13 |
| 2021/0037112 A1 | 2/2021 | Ankireddypalle |

OTHER PUBLICATIONS

Office Action (Final Rejection) dated Feb. 22, 2022 for U.S. Appl. No. 16/775,301 (pp. 1-28).

\* cited by examiner

CAPTURING DATA LAKE CHANGES

FIELD OF TECHNOLOGY

This patent document relates generally to data pipeline systems and more specifically to data pipeline systems that include data lakes.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One use of a cloud computing system is storing data in a data lake, which may be used to hold a potentially vast amount of raw data in a native format until needed. Data may be periodically retrieved from such a data lake and then processed for consumption by a downstream service. This process often involves transforming the data from the native format to a different format more suitable for consumption by the downstream service.

BRIEF DESCRIPTION OF THE DRAWINGS

The included drawings are for illustrative purposes and serve only to provide examples of possible structures and operations for the disclosed inventive systems, apparatus, methods and computer program products for data pipelining. These drawings in no way limit any changes in form and detail that may be made by one skilled in the art without departing from the spirit and scope of the disclosed implementations.

DETAILED DESCRIPTION

Figure 1:
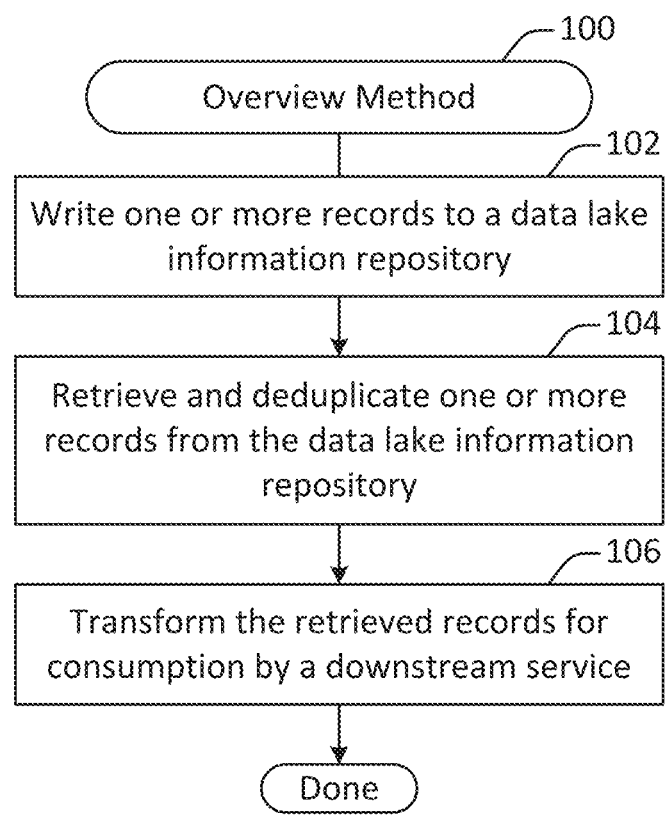
FIG. 1 illustrates an example of an overview method, performed in accordance with one or more embodiments.

According to various embodiments, a data lake is a repository of data in which data is stored in a natural or raw format. For example, data may be stored in object blobs or files. Such data may serve as a source for advanced analytics, machine learning, visualization, and/or reporting. A single data lake may include data stored in different formats, and may potentially include vast amounts of data. For instance, a data lake may include structured data from relational databases (e.g., rows and columns), semi-structured data (e.g., CSV files, log files, XML files, JSON files), unstructured data (e.g., emails, documents, PDFs) and/or binary data (images, audio, video).

In some implementations, changes to a data lake may be tracked by updating a change repository that identifies when different partitions in the data lake were updated. A change repository may be implemented as an append-only log. A downstream transformation service may periodically scan the log table to identify the partitions that changed since the previous iteration of the transformation service, by comparing the locally stored checkpoint against the insertion time of the records in the change repository. The downstream transformation service may then select data from only the partitions that have changed and that therefore included unprocessed data. However, the change log can be fast-growing and can include entries that persist for a considerable length of time (e.g., a month). During that time, the change repository can accumulate many change records, so scanning the entire change repository by insertion time can be expensive in terms of performance, potentially requiring a full table scan.

In some implementations, inconsistent information may be stored in a data lake. During data ingestion, one or more upstream producer jobs may append information to a data lake. Because the ingestion pipeline is a high-volume data pipeline that provides for highly scalable data writes, the ingestion pipeline may not read from the data lake prior to writing new information, but rather may simply append new data to the existing data. Mutations to data may be appended as data update or data delete operations. Data write events that are appended to the data lake through the mutation portion of the ingestion pipeline arrive in order after ingestion. Such data write events may be "upserted" or merged using, for instance, the "merge" operation available through the Delta Lake data lake management service.

In some implementations, duplicate data entries may be added or appended to the data lake by the ingestion pipeline, for any of various reasons. For example, a data source may be recrawled, and all data added to the data lake even if the data was already present. As another example, an incomplete data write operation in the ingestion pipeline may be retried, leading to the duplication of any records that have already been inserted.

Complicating matters further, mutations may be applied to one or more of the duplicate data entries, potentially leading to the same data records with the same primary keys having multiple states.

When using conventional techniques, the storage of inconsistent information can create problems for the downstream transformation service. When the transformation service reads from the upstream data lake, the transformation service can retrieve duplicate records with different values. Conventionally, a data lake typically does not maintain an indication or a flag for a record that identifies which of the duplicate records are valid and which are invalid. Unless data record is deduplicated and the correct version of the data record is selected, the data transformation service may end up persisting the same data record with different values, leading to incorrect results in a downstream consumer of the data, such as a downstream data analytics service.

Conventional approaches for resolving inconsistent information are inapplicable in the data lake context. For example, inserting records with a "read before write" procedure in which the data lake is first checked for existing records before inserting new records is not viable since it reduces the performance of the ingestion pipeline and renders the ingestion pipeline substantially less scalable. As another example, marking one or more of a set of duplicate records as valid or invalid by the upstream producer in the data ingestion process would impose additional overhead and require the producer to maintain another computing job to to scan, flag, and/or clean such records.

According to techniques and mechanisms described herein, a transformation service downstream from the data lake may deduplicate records based on a reliable criteria or mechanism, and identify the correct version of a duplicated record. Using these techniques and mechanisms, the transformation service may distinguish valid records from invalid records, and discard the invalid records.

According to various embodiments, techniques and mechanisms described herein provide for the rapid identification of updated partitions in a data lake. The change log table may be scanned efficiently, without performing a full table scan. Accordingly, such techniques and mechanisms may provide for improved read performance of change logs, thus improving the overall performance of the service. Fetching the latest changes up until consumption may be guaranteed, which means stale data need not be consumed.

In some embodiments, techniques and mechanisms described herein may provide for fetching the most recent data, without additional overhead costs involved in running streaming jobs, or running batch jobs more frequently than producer jobs. Additionally, such solutions may be scalable to support more customers and/or producers on-boarding and writing data to the change repository, while minimizing requirements for additional hardware. Further, scalability may not require synchronizing clocks and cadences across multiple jobs. In addition, storage costs may be reduced since older log entries may be deleted.

In some embodiments, techniques and mechanisms described herein may provide for an improved experience for the final recipient of the data. That recipient may be able to receive consistent, deduplicated data without noticeable slowdown of the data ingestion, storage, and transformation pipeline. That recipient may also be able to observe the most recent changes arriving from the upstream data source more rapidly, for instance in compliance with a more rigorous service level agreement (SLA). The recipient may be able to quickly join an analytics service platform and make use of other downstream services.

Consider the example of Alexandra, a data analyst tasked with analyzing customer engagement data. Using conventional techniques, data processing pipelines typically introduce inconsistencies into data records, leading to errors in Alexandra's analysis or requiring substantial manual effort to fix. For instance, if a customer submits a rating for a service and then changes that rating, using conventional techniques Alexandra may be analyzing a data set that includes both the initial and updated rating rather than only the updated rating. However, using techniques and mechanisms described herein, Alexandra may be able to analyze consistent data that is cleaned of such problems, leading to reduced analysis time and improved results.

For the purpose of illustration, data lakes may be described herein as storing engagement data. For example, an on-demand computing services environment may be configured to provide computing services to clients via a network such as the Internet. Those clients may have customers, and interactions between clients and customers may be captured as engagement data. Engagement data may include information such as emails or other messages between clients and customers, the identities of individuals associated with such communications, times and dates associated with the such communications, whether clients and customers have opened or processed the communications, and other such information. Such data may be aggregated and stored, and then consumed by one or more services such as machine learning services or customer analytics services. Accordingly, engagement data may have many different sources and data types, and may be consumed by many different downstream services. However, it should be noted that the techniques and mechanisms described herein are in no way limited to customer engagement data, and instead are broadly applicable to virtually any type of data that may be stored in a data lake. FIG. 1 illustrates an example of an overview method 100, performed in accordance with one or more embodiments. The method 100 may be performed at one or more components with a computing services and/or data pipeline environment, such as the environments shown in FIGS. 2, 6, 7, and 8.

One or more records are written to a data lake information repository at 102. In some embodiments, each record may correspond to a file, such as a Parquet file or an Avro file. Alternatively, a record may correspond to one or more database entries. As discussed herein, data lakes may store data in any of a variety of ways.

In some implementations, writing one or more records to a data lake may involve receiving data from one or more data sources and output received data to a data ingestion and/or mutation pipeline, Data from the pipeline may then be stored in a data lake by one or more batch jobs. Additional details regarding the storage of records to a data lake are discussed throughout the application, such as with respect to FIG. 3.

At 104, one or more records are retrieved and deduplicated from the data lake information repository. According to various embodiments, deduplicating the records may involve identifying one or more duplicate records sharing a common identifier, identifying one or more updates to such duplicate records, and determining an appropriate version of a duplicate record. Additional details regarding the transformation of records are discussed throughout the application, such as with respect to FIGS. 4 and 5.

The retrieved records are transformed for consumption by a downstream data service at 106. For instance, data may be processed for transmission to a database, a machine learning service, or some other downstream consumer. Additional details regarding the transformation of records are discussed throughout the application, such as with respect to FIGS. 4 and 5.

Figure 2:
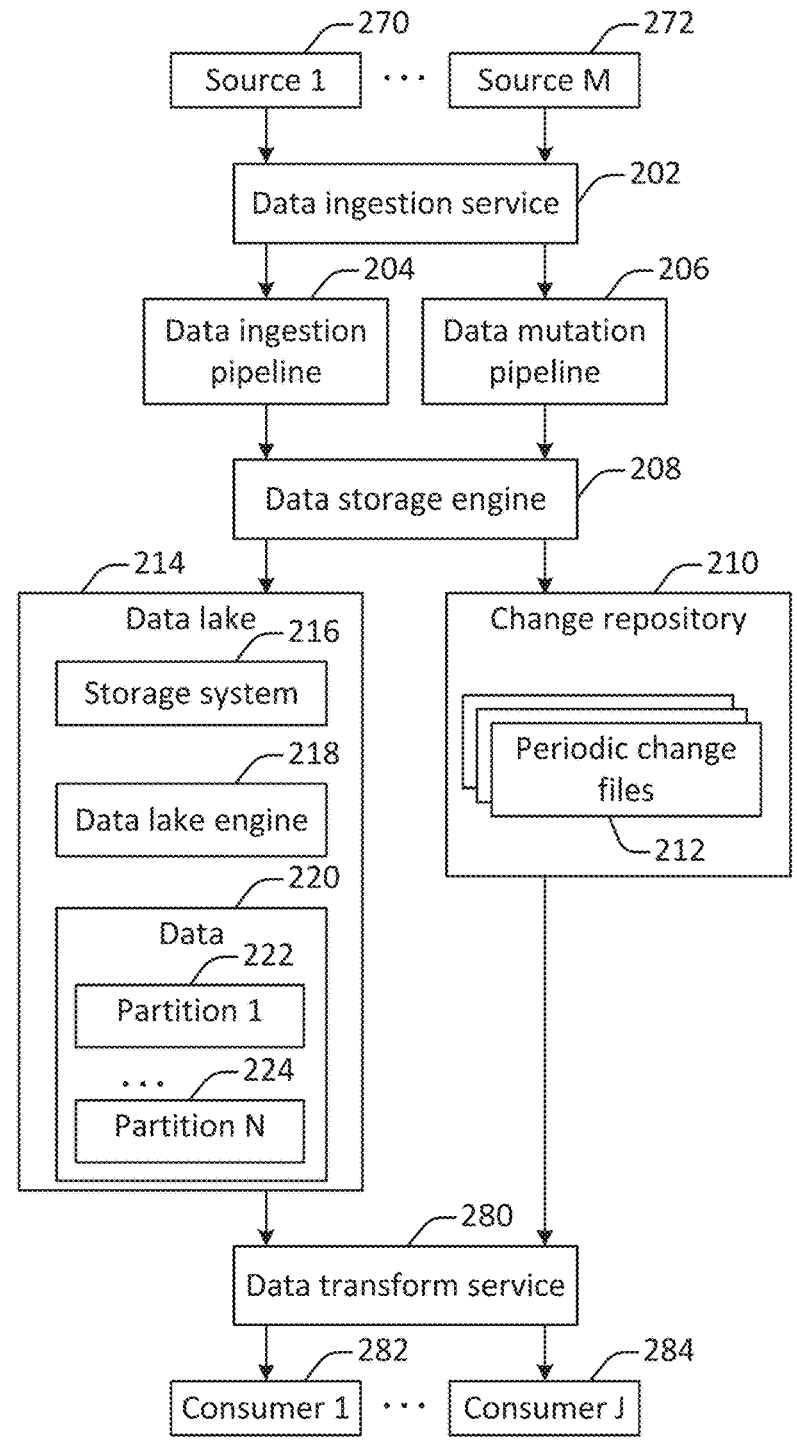
FIG. 2 illustrates an example of an arrangement of components in a data pipeline system, configured in accordance with one or more embodiments.

FIG. 2 illustrates an example of an arrangement of components in a data pipeline system 200, configured in accordance with one or more embodiments. The data pipeline system 200 may be used to receive data from one or more data sources, store the data in a data lake, and transform the data for downstream use.

The data pipeline system 200 includes one or more data sources 270 through 272, which provide data to a data ingestion service 202. The data ingestion service 202 outputs the data to a data ingestion pipeline 204 and/or a data mutation pipeline 206. A data storage engine 208 reads the data from the pipelines and stores it in a data lake 214. Changes made to the data lake 214 are reflected in a change repository 210. The data lake 214 includes a storage system 216 on which data is stored, as well as a data lake engine 218 for managing the files. The stored data 220 is separated into some number of partitions, including the partitions 1 222 through N 224. A data transform service 280 reads the periodic change files to identify changes to the data 220. The data transform service 280 then reads those changes, transforms the data, and provides the transformed data to downstream consumers 1 282 through J 284.

According to various embodiments, the data sources 1 270 through M 272 may include any suitable sources of data that may be stored in a data lake. For instance, such data sources may include, but are not limited to, file repositories, database systems, and social networking feeds. Keeping with the example of engagement data in an on-demand computing services environment, such data sources may include information on emails sent between clients and their customers, whether and when such emails were opened or replied to, and/or the identities of individuals involved in such communications.

According to various embodiments, the communication linkages shown in FIG. 2 may be arranged in any suitable way. For example, one or more linkages may be configured in a push framework, in which a data source actively transmits updated information to a recipient. As another example, one or more linkages may be configured in a pull framework, in which a data recipient retrieves data from a data source, for instance at periodic intervals. As still another example, one or more linkages may have elements of both push and pull frameworks.

According to various embodiments, the data ingestion service 202 may be configured to receive data from one or more data sources. For instance, data may be provided to the data ingestion service 202 via a change data capture bus or other such service. The data ingestion service 202 may then distinguish between data records that are new and updates to existing data records. New data records may be provided to the ingestion pipeline 204, while mutated records may be provided to the mutation pipeline 206. Such pipelines may be used to maintain read and write streams of data, like a messaging service, for consumption by one or more downstream jobs spawned by the data storage engine 208. In some configurations, such pipelines may be implemented via Apache Kafka.

In some implementations, the data storage engine 208 may store ingestion and mutation data in the data lake 214. For example, the data storage engine 208 may identify an appropriate data partition for a data entry. Then, the data storage engine 208 may append ingestion data to the appropriate data partition, with a new data record identifier. The data storage engine 208 may also identify an appropriate existing data record identifier for mutation data, and then append the mutation data to the appropriate data partition, with the existing data record identifier. In some configurations, the data storage engine 208 may be configured to store data via one or more Apache Spark jobs.

According to various embodiments, the change repository 210 may store information about data updates to the data lake 214. For example, when a data lake write is successful, the data storage engine 208 may store the keys of partitions that were updated in a change log in the change repository 210. One example of such a configuration is a ChangeLog table backed up by Databricks Delta Lake open source storage layer. Multiple upstream jobs may write to the same change log, which may be implemented as an append-only log. The change log may store, for instance, Delta Lake partition keys for changed partition, along with supporting metadata.

In some implementations, the data lake 214 may store the data received by the ingestion service 202. The data lake 214 may store such data in the storage system 216. The storage system 216 may be implemented on any network-attached storage location. For example, the storage system 216 may be implemented as one or more Google Storage buckets, Amazon S3 buckets, and/or Microsoft Azure Blog Storage buckets.

In some embodiments, the data lake engine 318 may act as a storage layer to provide structure and reliability to the data lake. It may run on top of the data lake, and provide services such as ACID (i.e., atomicity, consistency, isolation, durability) transactions, scalable metadata handling, unified streaming, and unified batch data processing. In some configurations, the data lake engine 318 may be the open source Delta Lake engine.

According to various embodiments, the data 220 may include any data suitable for storage in a data lake, and may be partitioned in accordance with any suitable partition scheme. For instance, keeping with the example of engagement data, the data may be partitioned into buckets by {orgId, engagementDay}, so that all engagement data for a particular organization on a particular day may be stored in a unique bucket in the storage system 216.

According to various embodiments, the data transform service 280 may be configure to initiate one or more periodic batch jobs to consume and transform data from the upstream data lake. For instance, the transform service may convert such data into snapshot files and save them in a downstream data store. During each iteration, the transform service may read from the change repository 210 the identifiers of partitions changed since the previous iteration of the transform service. For instance, in the example of engagement data, the transform service 280 may read the {orgID, engagementDay} identifier corresponding to any updated partitions. Based on these keys, the transform service 280 may fetch partition snapshots from the data lake and may checkpoint the latest record read from the change log table for use in subsequent iterations. In some configurations, the data transform service 280 may be implemented as one or more Apache Spark jobs.

Figure 5:
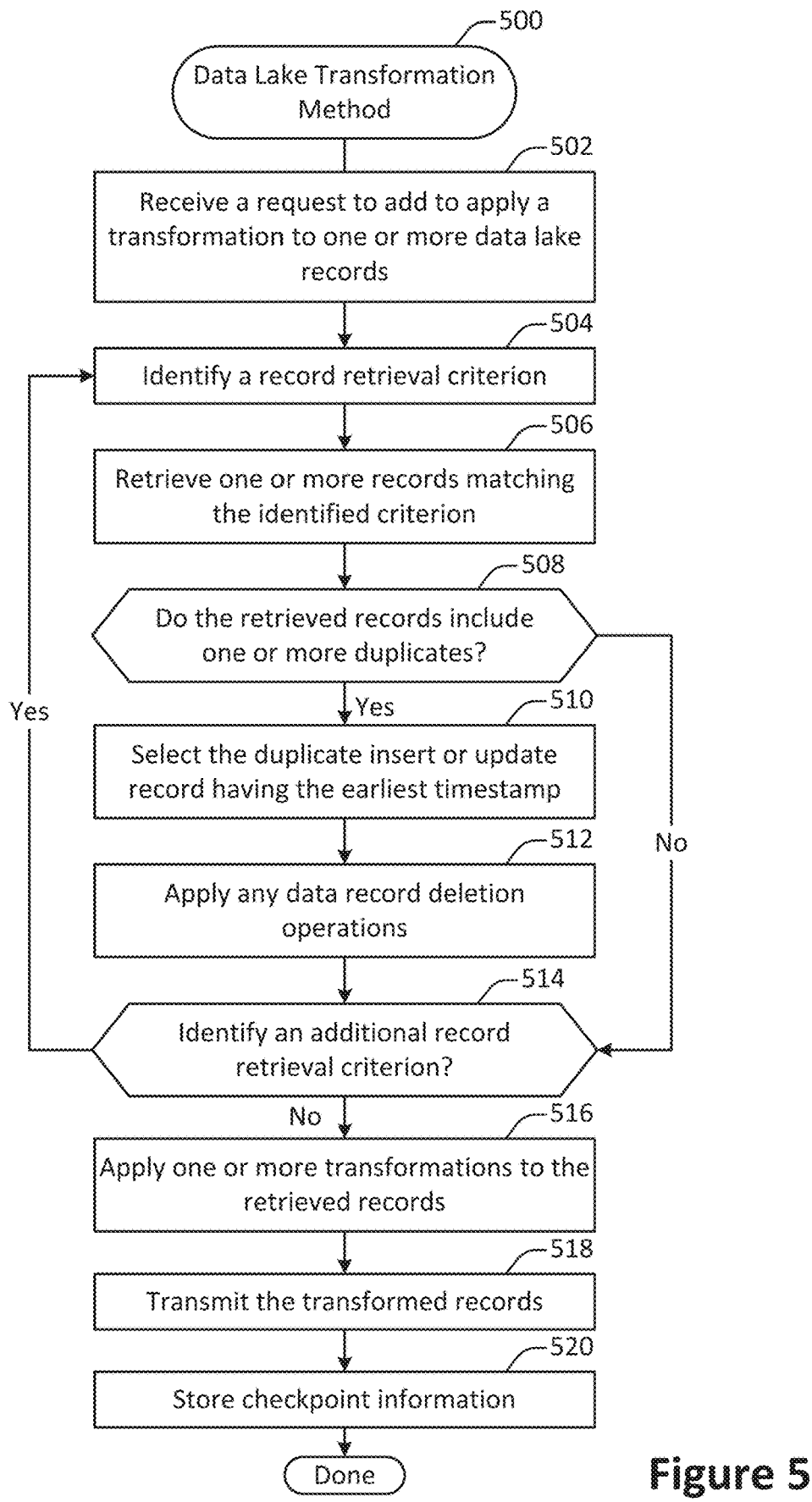
FIG. 5 illustrates an example of a method for transforming data stored in a data lake, performed in accordance with one or more embodiments.

Additional details regarding the operation of the data transform service are discussed throughout the application, such as with respect to the method 500 shown in FIG. 5. In some implementations, the change repository 210 may be implemented as a unified change metadata store that captures change data with a single schema from any upstream data lake backed by a distributed object store or distributed file system. Upstream jobs writing data to the data lake may also write a location-based pointer of the data partition that contains the change to the change repository 210. The location-based pointer may contain the location of the changed partition in the data source which could be any suitable distributed object store (e.g., an Amazon S3 bucket location) or a distributed file system location (e.g., a Hadoop File System location). The change metadata store may be partitioned by time window (e.g., period) so that upstream jobs may write the location-based pointers in the current time period file partition. For instance, each time period may be associated with a respective file of location-based pointers. For example, a unified change metadata store may store location-based pointers in the following format: "[PROTOCOL]://staging-eap-wave/[ENV]/wave/engagement/data/

OrgID=[ID]/date=[DATE_STAMP]/[PARTITION_ID].[FILE_TYPE]", where PROTOCOL identifies the storage and/or communication protocol (e.g., S3A, HDFS), ENV is the on-demand computing services environment, DATE_STAMP identifies the time period associated with the generated data, PARTITION_ID identifies the partitioned file in which the data is stored, and FILE_TYPE identifies the file type (e.g., Avro, Parquet).

Figure 3:
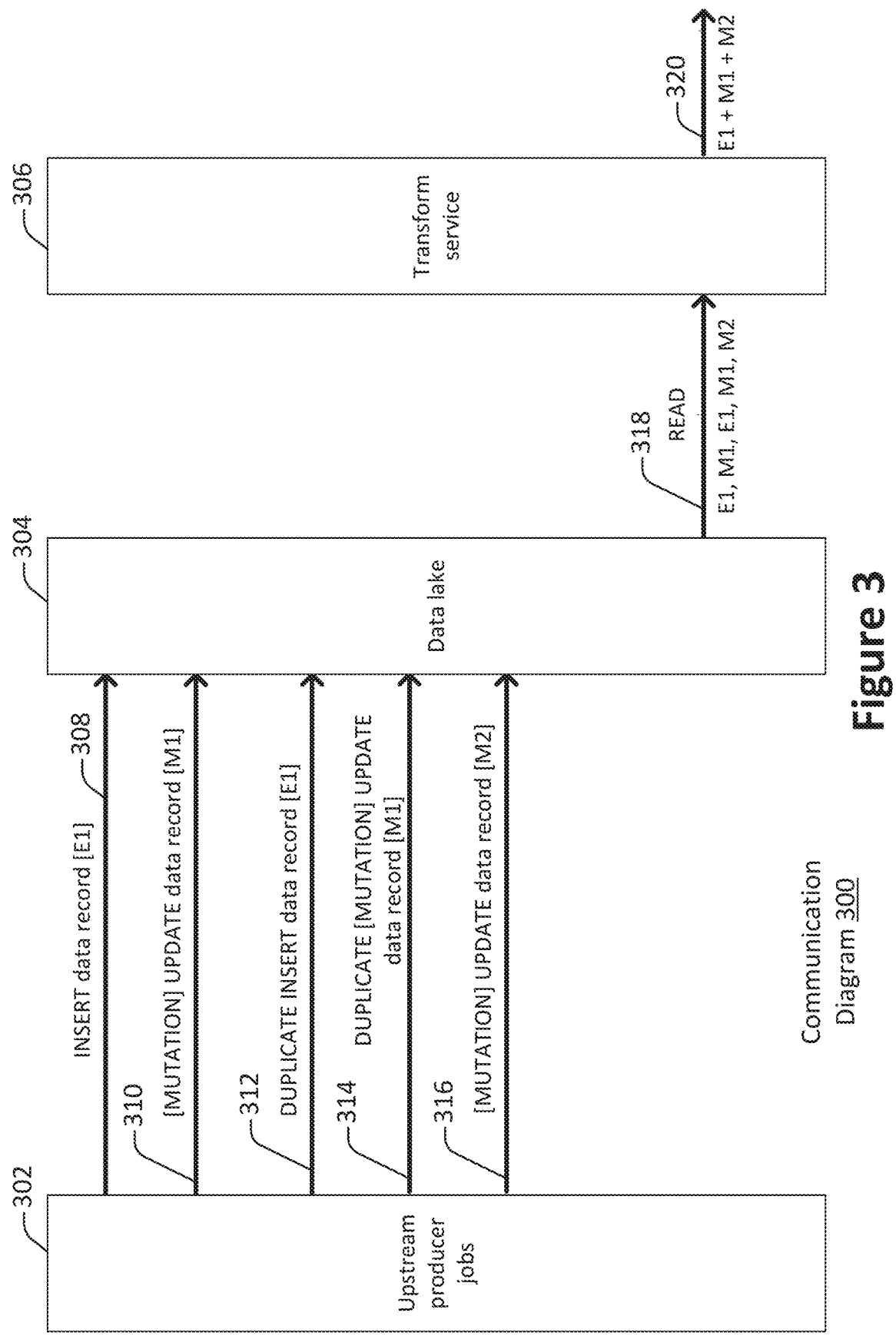
FIG. 3 illustrates an example of a communication diagram configured in accordance with one or more embodiments.

FIG. 3 illustrates an example of a communication diagram 300 configured in accordance with one or more embodiments. The communication diagram 300 illustrates communications between one or more upstream producer jobs 302, a data lake 304, and a transform service 306. The communication diagram 300 illustrates one example of the resolution of a particular type of data inconsistency. However, techniques and mechanisms described herein may be used to facilitate the resolution of various types of data inconsistency. For instance, inconsistent data records may include one or more insertions, updates, and/or deletions.

At 308, a data record E1 is inserted into the data lake. At 310, a subsequent operation M1 updates the data record, for instance by altering it. According to various embodiments, because the data ingestion pipeline may not read prior to writing, the operation M1 is appended to the data lake.

At 312, a duplicate insertion operation inserts the data record E1 into the data lake again. According to various embodiments, because the data ingestion pipeline may not read prior to writing, the duplicate insertion at 312 may result in the same record (E1) being inserted into the data lake twice.

At 314, a duplicate mutation operation M1 updates the data record E1 again. According to various embodiments, because the data ingestion pipeline may not read prior to writing, the duplicate insertion at 314 may result in the same record (M1) being inserted into the data lake twice.

At 316, a subsequent operation M2 updates the data record, for instance by altering it. According to various embodiments, because the data ingestion pipeline may not read prior to writing, the operation M2 is appended to the data lake.

At 318, a data transform service reads the data record E1 from the data lake. Because the data record E1 has been inserted twice, and updated three times, various views of the data record E1 are possible (e.g., E1+M1, E1+M1+M1+M2, E1+M1+M2). However, the transformation service determines the correct view at 320: E1+M1+M2. The transform service may resolve the inconsistency to identify the accurate version of the record.

Figure 4:
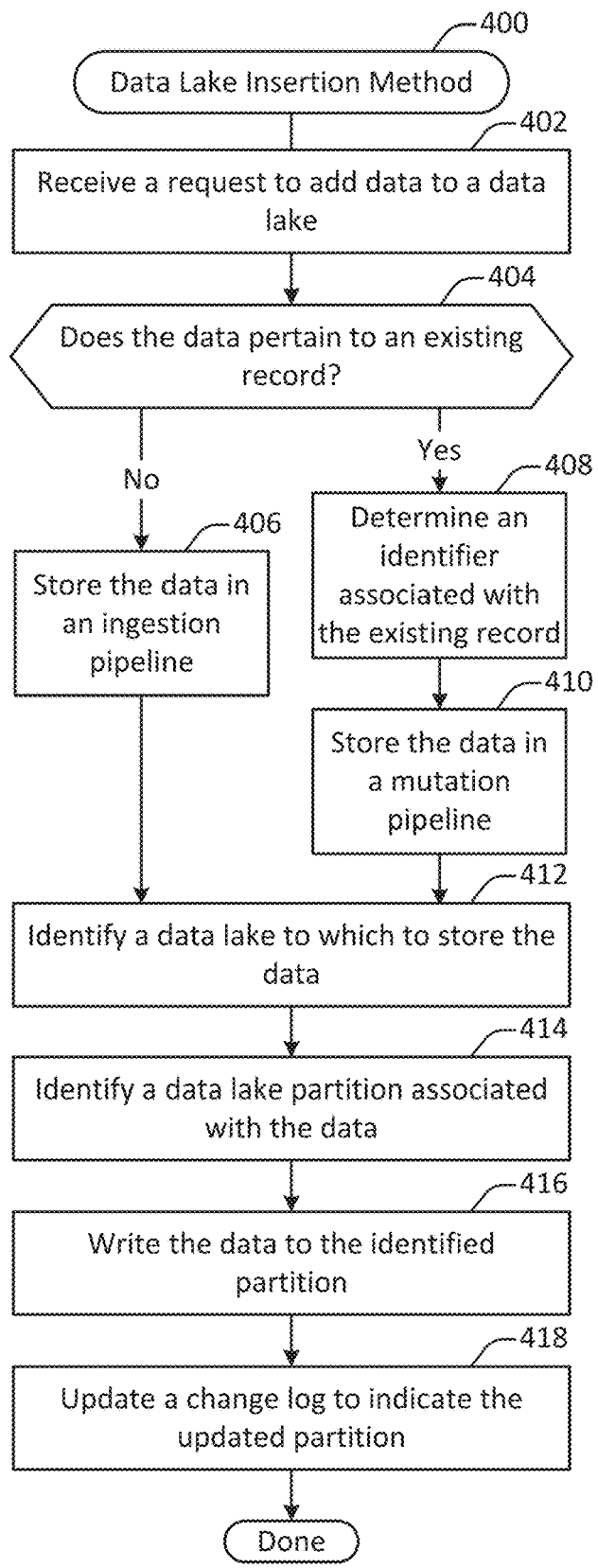
FIG. 4 illustrates an example of a method for inserting data into a data lake, performed in accordance with one or more embodiments.

FIG. 4 illustrates an example of a method 400 for inserting data into a data lake, performed in accordance with one or more embodiments. The method 400 may be used to receive data from one or more sources and create one or more jobs for inserting the data into a data lake. The method 400 may be implemented in a computing environment, such as the environments discussed with respect to the FIGS. 2, 3, 6, 7, and 8.

In some implementations, the method 400 may be employed so as to handle a potentially large stream of input data. Such data may be minimally processed and stored in ingestion and mutation pipelines, which may be used as buffers for storage in the data lake. Data may then be retrieved from the buffers and stored in a partition in the data lake, at which point a log file may be updated to identify the time at which the partition was updated.

A request to add data to a data lake is received at 402. According to various embodiments, the request may be received at a data ingestion service 202. For example, one or more of the data sources 1 270 through M 272 may transmit data to the data ingestion service 202 for ingestion. As another example, the data ingestion service 202 may periodically query one or more data sources for updated data.

A determination is made at 404 as to whether the data pertains to an existing record. If the data does not pertain to an existing record, then at 406 the data is stored in an ingestion pipeline. For example, the data may be stored in the data ingestion pipeline 204. The data ingestion pipeline 204 may be implemented in a clustered storage system. The data ingestion pipeline 204 may store the data temporarily, until it can be processed by one or more storage jobs for storage in the data lake.

If the data does pertain to an existing record, then at 408 an identifier associated with the existing record is determined. According to various embodiments, the identifier may be determined by, for instance, employing a field associated with the data, for example by determining a hash value of the field.

At 410, the data is then stored in a mutation pipeline. For example, the data may be stored in the data ingestion pipeline 204. The data mutation pipeline 206 may be implemented in a clustered storage system. The data mutation pipeline 206 may store the data temporarily, until it can be processed by one or more storage jobs for storage in the data lake.

A data lake in which to store the data is identified at 412. In some implementations, the data lake may be identified by a batch storage job configured to retrieve data from one or more of the pipelines and store the retrieved data to the data lake.

A data lake partition associated with the data is identified at 414. According to various embodiments, the data lake partition may be identified by the data lake engine responsible for managing the data lake. For instance, if the data lake is partitioned by {OrgID, EngagementDate}, the organization identifier and the engagement date associated with the ingested or mutated data record may be identified, and then used to determine the data lake partition identifier.

The data is written to the identified partition at 416. In some implementations, the data may be written by storing the data record to the appropriate location in the storage system. For example, the data may be appended to an Amazon S3 bucket or Microsoft Azure blob storage bucket.

A change repository is updated to indicate the updated partition at 418. According to various embodiments, updating the change repository may include writing one or more entries to a file or files in the change repository. The entry may identify, for instance, the date on which the identified partition was updated.

In some embodiments, change files may be stored at a period that is consistent with the execution of the transformation service. For instance, if the transform service is initiated once per hour, then each hour may correspond to a different change file. However, in other configurations the change files may be associated with periods that are greater or less than the periodicity of the transform service.

In some implementations, different periods of the change repository may be stored in separate files. Alternately, the change repository may be stored in a common file in which the period (e.g., the hour) associated with the change log is stored in a data column. The data storage engine 208 may then store the partition update record to the correct file and/or store the correct period value in the period data column when updating the change repository.

FIG. 5 illustrates an example of a method 500 for transforming data stored in a data lake, performed in accordance with one or more embodiments. In some implementations, the method 500 may be implemented at one or more components in a computing services environment, such as the environments discussed with respect to FIGS. 2, 6, and 7. For instance, the method 500 may be implemented at the data transform service 280 shown in FIG. 2.

A request is received at 502 to transform one or more data lake records. In some implementations, the request may be generated by a service scheduler. For instance, the transformation method 500 may be run periodically, at scheduled times, or upon request. In some configurations, the transformation method 500 may be run once per hour. However, other configurations are possible. For instance, the frequency with which the transformation method 500 is run may vary based on, for example, the frequency with which the data is updated and/or the amount of data being updated.

One or more record retrieval criteria are identified at 504. According to various embodiments, a variety of record retrieval criteria may be employed. For example, the record retrieval criteria may be used to select data lake partition update records that have not yet been transformed. Suck criteria may be determined at least in part based on selecting one or more data lake partition update records from a change log.

In some implementations, the record retrieval criteria may be determined based on checkpoint information determined and stored in a previous iteration of the data lake transformation method, as discussed with respect to 520. For example, one or more data lake partition update records may be retrieved from a change log. Then, the transformation service may retrieve data lake partition update records based on a checkpoint based on the change file periodicity. For instance, if the transformation service is associated with a checkpoint of 2019_11_12_12, then the transformation service has already processed change log records having an insertion time up until 11/12/2019 12:00. Thus, when retrieving partition update records, the transform service may select those partition update records inserted in a period after the insertion period checkpoint (e.g., a period of 1:00 or later).

In some implementations, the transform service may read change metadata from potentially multiple upstream sources. Such update records may then be grouped by source based on the prefix in the location pointers. Such pointers may identify the location of the data irrespective of the underlying storage technology or data partitioning strategy of the source. Such an approach may be used to support multiple distributed file systems or object stores, and also to add new ones without any change in the schema of the data being written in the change repository. In this way, the transform service or any other consumer using the change repository need not add native dependency of the upstream data lake sources to consume data. For example, one upstream source may have a data lake in Databricks Delta in parquet format on Amazon S3 partitioned by {orgId, EngagementDate} fields, and another data source may have a data lake on HDFS in parquet format and partitioned by {orgId, whoId} fields, and yet another data source may have data stored with Azure blob storage in Avro file format and partitioned by {orgId, source}. Nevertheless, one metadata store can support capturing changes to all of these stores. Further, the system need not keep track of the columns of the data partition that changed, such as {orgID, engagementDate}, {orgID, whoId}, or {orgID, source} for respective data source. This helps the store to be schema-less. Since the location pointers are pointers to files, the transform service may be agnostic of the data source using "Delta lake" or "Azure blob storage" and may simply reads them as files depending on their formats. In such a configuration, the change repository may maintain one change file per time window (e.g., one per hour).

One or more records matching the identified criteria are retrieved at 506. According to various embodiments, the data may be selected by retrieving all data stored within a selected partition. Alternately, a more specific selection procedure may be used. For instance, the partition may maintain an index that identifies records within the partition that were updated, as well as when those records were updated. In this way, the service may be able to select particular records within a partition for retrieval and transformation, and need not apply the transformation to data that has already been transformed.

A determination is made at 508 as to whether the retrieved records include one or more duplicates. For example, in FIG. 3, a retrieval query may retrieve the data record E1 inserted at 308, the record E1 inserted at 312, the data record M1 inserted at 310, the data record M1 inserted at 114, and the data record M2 inserted at 314. From these records, the data records E1 and M1 are duplicates.

At 510, the duplicate insert or update record having the earliest write timestamp is selected. For example, in FIG. 3, the data records E1 inserted at 308 and M1 inserted at 310 may be selected because they were written prior to their duplicates. In this way, when the record is transformed at 516, the input record to the transformation may be consistent and deduplicated. For example, in FIG. 3, the record E1+M1+M2 may be treated as an input to the transformation.

Any data record deletion operations are applied at 512. Consider the example in which a record E2 is ingested, and then subsequently deleted in a mutation M3, which is followed by a duplicate insertion of record E2. If the initial record E2 is actually deleted at M3, then despite the deletion event the record E2 may be incorrectly maintained due to the duplicate insertion, even after retrieving the record with the smallest creation timestamp. Accordingly, a deletion operation may initially soft delete a record by marking the record for deletion after a certain period of time, for instance a period of time greater than the interval at which the transform service is performed. When the record is selected having the earliest timestamp, a determination may be made at 512 as to whether the record has a delete flag marked. If yes, the record and its copies may be dropped at 512.

A determination is made at 514 as to whether to select an additional record retrieval criterion. According to various embodiments, additional record retrieval criteria may continue to be selected until all suitable records are retrieved for transformation. For example, additional record retrieval criteria may continue to be selected until all records stored in the data lake have been transformed. As another example, additional record retrieval criteria may continue to be selected until all records stored in the data lake that exhibit one or more designated characteristics have been transformed.

One or more transformations are applied to the retrieved records at 516. According to various embodiments, any of a variety of transformations may be applied, with the particular transformation being dependent on the context. The context may include, for instance, characteristics of the data being transformed as well as the characteristics of a recipient of the data. For example, data stored in Apache Parquet or Apache Avro files may be transformed into one or more database insert statements, CSV files, or other such output formats.

The transformed records are transmitted at 518. According to various embodiments, the transformed records may be transmitted to any suitable downstream consumer. As discussed with respect to FIG. 2, such downstream consumers may include one or more databases, file repositories, data processing services, or other such recipients.

In particular embodiments, different data sources may receive the same or different data. For instance, the same data may be transformed into one or more CSV files for receipt by one or more machine learning services and transformed into one or more database insert queries for receipt by one or more database systems.

Checkpoint information is stored at 520, According to various embodiments, the checkpoint information may identify the most recent period completely processed by the data lake transformation method. In addition, the checkpoint information may identify the insertion time of the most recently processed record in the most recent period partially processed by the data lake transformation method. Such information may be retrieved by the data lake transformation method in the next iteration, at operation 504.

According to various embodiments, one or more of the operations described herein may be omitted, and/or one or more additional operations may be performed. For instance, a notification of a duplicate record may be transmitted. According to various embodiments, the notification may be transmitted to any suitable recipient. For example, the notification may be transmitted to the data lake, for instance for use in removing duplicate records from the data lake. However, in some configurations, many records may be retrieved and transformed a limited number of times, reducing the need to remove duplicate records from the data lake. In such configurations, a notification of duplicate records need not be transmitted.

Figure 6:
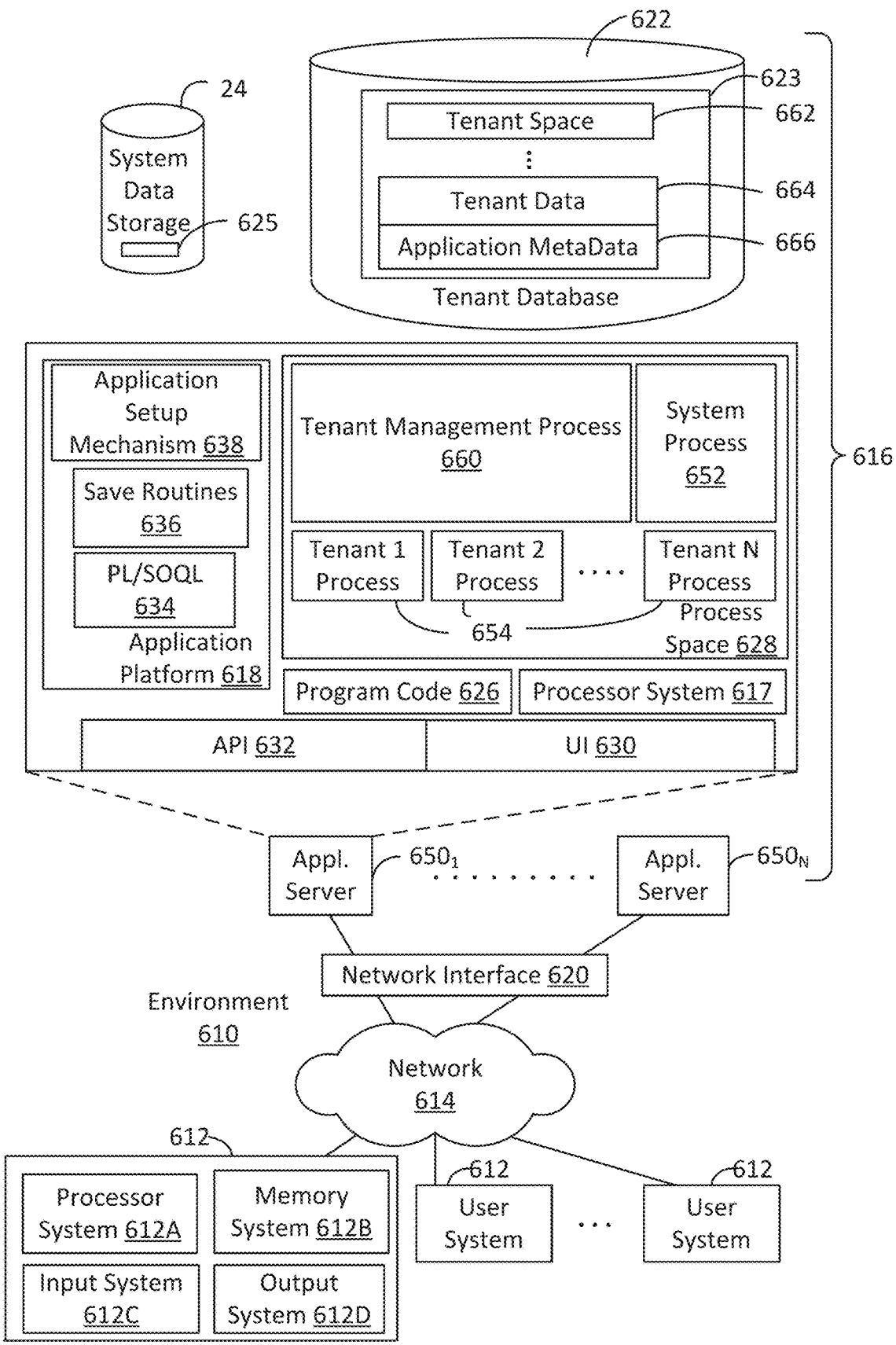
FIG. 6 shows a block diagram of an example of an environment that includes an on-demand database service configured in accordance with some implementations.
Figure 7A:
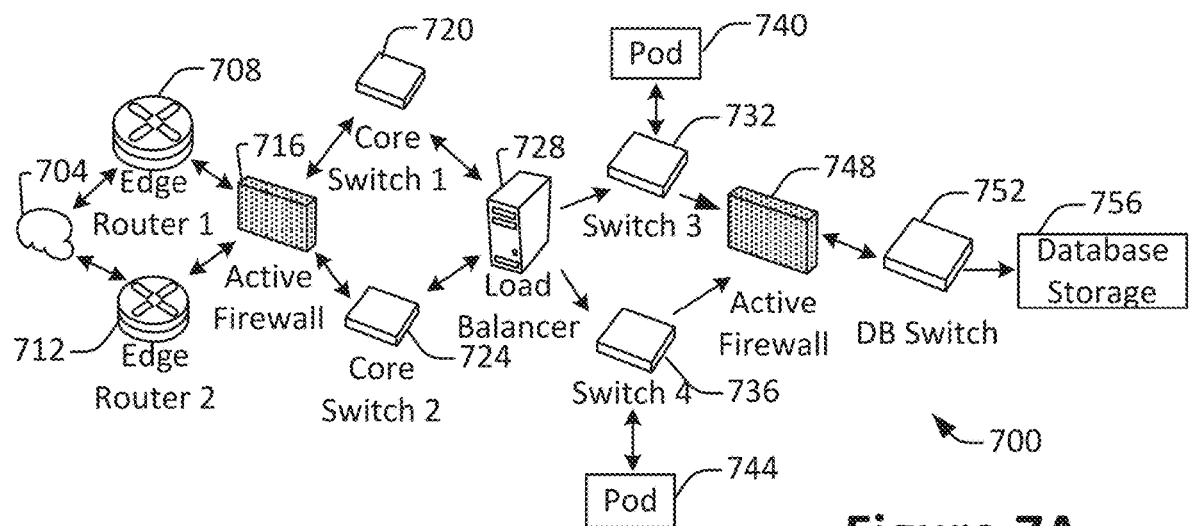
FIG. 7A shows a system diagram of an example of architectural components of an on-demand database service environment, configured in accordance with some implementations.
Figure 7B:
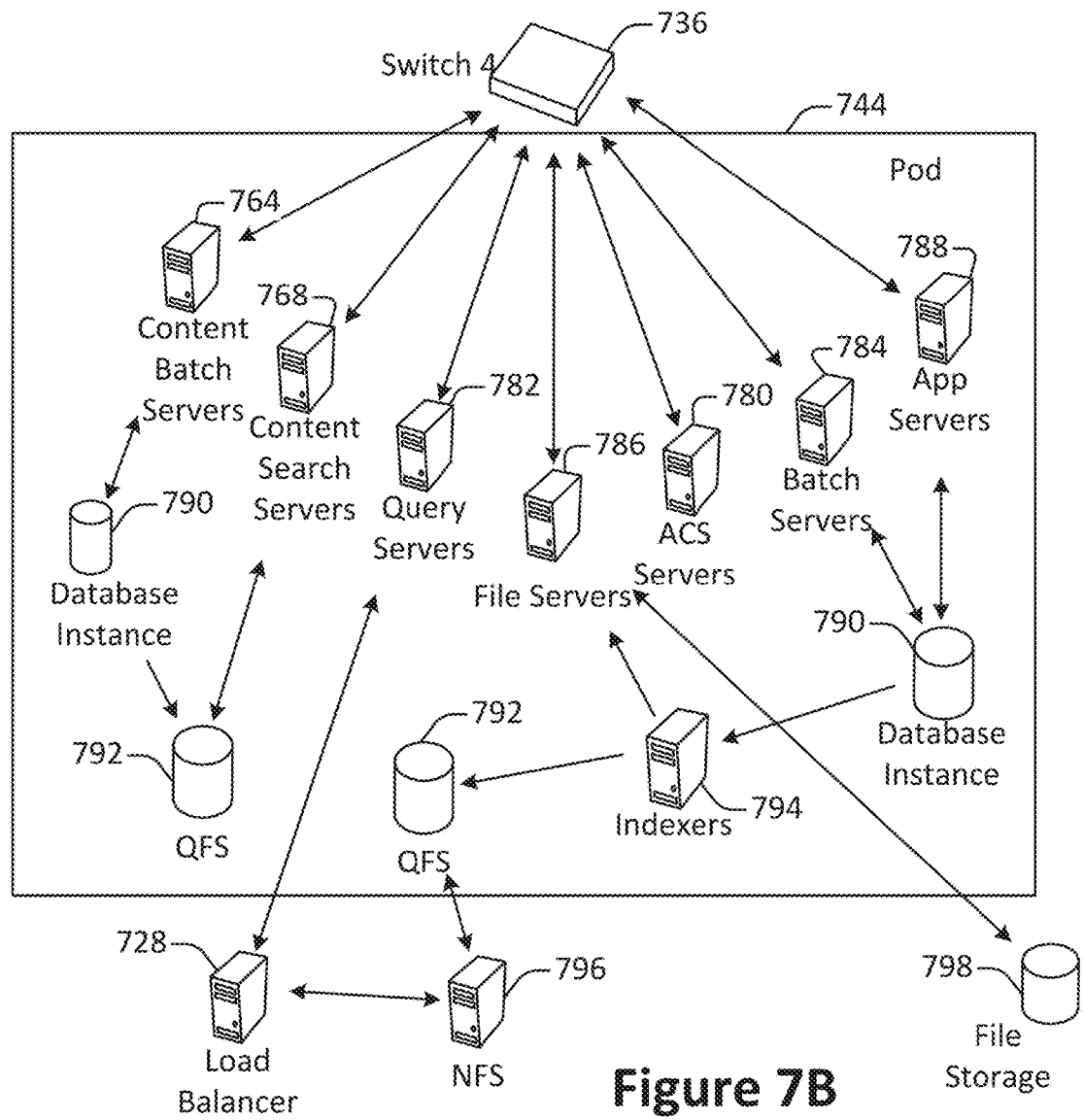
FIG. 7B shows a system diagram further illustrating an example of architectural components of an on-demand database service environment, in accordance with some implementations.
Figure 8:
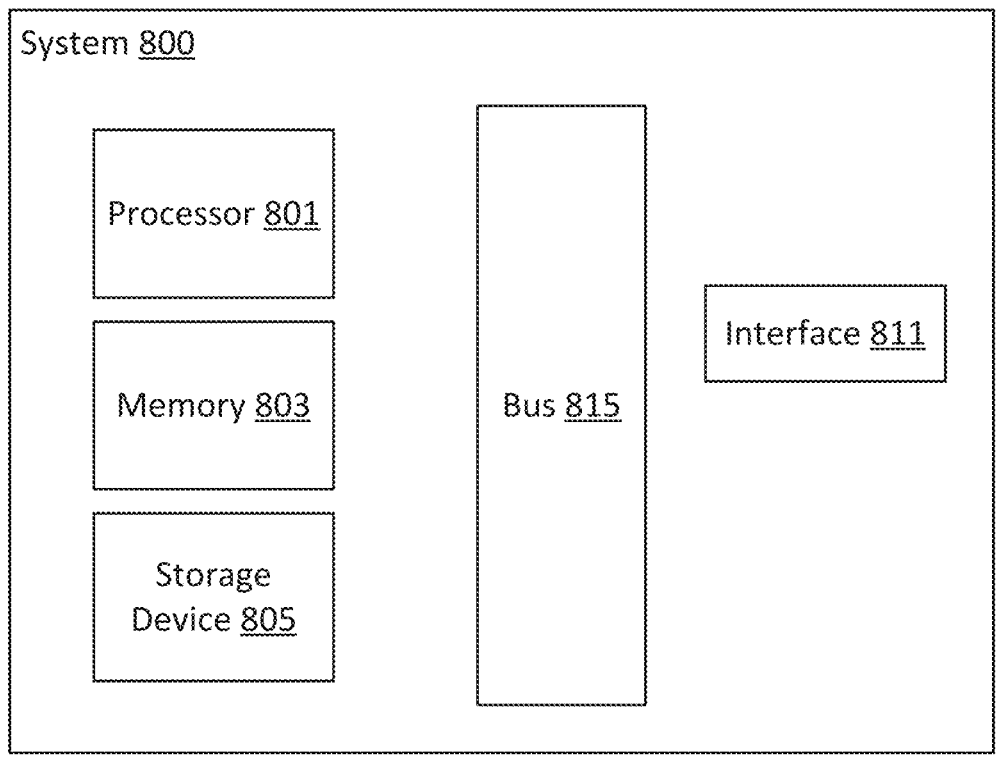
FIG. 8 illustrates one example of a computing device, configured in accordance with one or more embodiments.

FIG. 6 shows a block diagram of an example of an environment 610 that includes an on-demand database service configured in accordance with some implementations.

Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects, A relational database management system (RDBMS) or a similar system may execute storage and retrieval of information against these objects.

In some implementations, the application platform 18 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data.

Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based data pipeline system. For example, in some implementations, system 6:16 may include application servers configured to implement and execute data pipelining software applications. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 6 12D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a data pipeline, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MIS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MIS arrangement, system 616 may separate and share data between users and at the organization-level in a variety of manners. For example, for certain types of data each user's data might be separate from other users' data regardless of the organization employing such users, Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems ?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process data lake record information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computer-implemented method comprising:
   receiving a request to transform records in a data lake that match one or more query criteria, the data lake configured to store structured, unstructured, and semi-structured data consumed by a plurality of downstream data services in an on-demand computing services environment;
   retrieving from the data lake a plurality of data lake records that match the one or more query criteria, the plurality of data lake records including a first data lake record and a second data lake record, the first data lake record being associated with a designated data lake record identifier and a first insertion time identifying when the first data lake record was created, the second data lake record being associated with the same designated data lake record identifier and a second insertion time identifying when the second data lake record was created;
   generating a transformed data lake record for at least one of the plurality of downstream data services by transforming the first data lake record to a data format of the downstream data service, the transforming being responsive to determining that the first insertion time precedes the second insertion time; and
   transmitting the transformed data lake record to the at least one of the plurality of downstream data services.

2. The computer-implemented method recited in claim 1, wherein the designated data lake record identifier is associated with a third data lake record corresponding with an update request.

3. The computer-implemented method recited in claim 2, wherein
   the third data lake record is associated with a third insertion time that precedes the second insertion time, and wherein the first insertion time precedes the third insertion time.

4. The computer-implemented method recited in claim 1, wherein the designated data lake record identifier is associated with a third request to delete the first data lake record, and wherein the third data lake record is associated with a third insertion time.

5. The computer-implemented method recited in claim 4, wherein the first data lake record is flagged for deletion after a designated period of time has elapsed after the third insertion time.

6. The computer-implemented method recited in claim 1, wherein a designated one of the data lake partition identifiers is associated with a pointer to a file in the data lake.

7. The computer-implemented method recited in claim 6, wherein the pointer to the file is a partition key in a Delta Lake change log table.

8. The computer-implemented method recited in claim 1, wherein the pointer to the file is a URI independent of a file system underlying the data lake.

9. The computer-implemented method recited in claim 1, wherein the data lake records are stored in one or more third-party cloud computing storage system.

10. The computer-implemented method recited in claim 1, wherein the data lake is accessible via an on-demand computing services environment providing computing services to a plurality of organizations via the internet.

11. The computer-implemented method recited in claim 10, wherein the computing services environment includes a multitenant database that stores information associated with the plurality of organizations.

12. A computing system implemented in a cloud computing environment, the computing system configured to perform a method comprising:
   receiving a request to transform records in a data lake that match one or more query criteria, the data lake configured to store structured, unstructured, and semi-structured data consumed by a plurality of downstream data services in an on-demand computing services environment;
   retrieving from the data lake a plurality of data lake records that match the one or more query criteria, the plurality of data lake records including a first data lake record and a second data lake record, the first data lake record being associated with a designated data lake record identifier and a first insertion time identifying when the first data lake record was created, the second data lake record being associated with the same designated data lake record identifier and a second insertion time identifying when the second data lake record was created;
   generating a transformed data lake record for at least one of the plurality of downstream data services by transforming the first data lake record to a data format of the downstream data service, the transforming being responsive to determining that the first insertion time precedes the second insertion time; and
   transmitting the transformed data lake record to the at least one of the plurality of downstream data services.

13. The computing system implemented recited in claim 12, wherein the designated data lake record identifier is associated with a third data lake record corresponding with an update request.

14. The computing system implemented recited in claim 13, wherein the third data lake record is associated with a third insertion time that precedes the second insertion time, and wherein the first timestamp precedes the third insertion time.

15. The computer system recited in claim 12, wherein the designated data lake record identifier is associated with a third request to delete the first data lake record, and wherein the third data lake record is associated with a third insertion time, and wherein the first data lake record is flagged for deletion after a designated period of time has elapsed after the third insertion time.

16. One or more non-transitory machine-readable media having instructions stored thereon for performing a method, the method comprising:

receiving a request to transform records in a data lake that match one or more query criteria, the data lake configured to store structured, unstructured, and semi-structured data consumed by a plurality of downstream data services in an on-demand computing services environment;

retrieving from the data lake a plurality of data lake records that match the one or more query criteria, the plurality of data lake records including a first data lake record and a second data lake record, the first data lake record being associated with a designated data lake record identifier and a first insertion time identifying when the first data lake record was created, the second data lake record being associated with the same designated data lake record identifier and a second insertion time identifying when the second data lake record was created;

generating a transformed data lake record for at least one of the plurality of downstream data services by transforming the first data lake record to a data format of the downstream data service, the transforming being responsive to determining that the first insertion time precedes the second insertion time; and transmitting the transformed data lake record to the at least one of the plurality of downstream data services.

17. The one or more non-transitory machine-readable media recited in claim 16, wherein the designated data lake record identifier is associated with a third data lake record corresponding with an update request.

\* \* \* \* \*